(12) United States Patent
Ko et al.

(10) Patent No.: US 6,633,357 B2
(45) Date of Patent: Oct. 14, 2003

(54) MULTI-DOMAIN LIQUID CRYSTAL DISPLAY DEVICE AND METHOD OF FABRICATING THE SAME

(75) Inventors: Doo Hyun Ko, Kyongsangbuk-do (KR); Joun Ho Lee, Taegu-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 100 days.

(21) Appl. No.: 09/891,124

(22) Filed: Jun. 26, 2001

(65) Prior Publication Data

US 2002/0018164 A1 Feb. 14, 2002

(30) Foreign Application Priority Data

Jun. 27, 2000 (KR) ........................................ 2000-35650

(51) Int. Cl.⁷ ............................................. G02F 1/1337
(52) U.S. Cl. ........................... 349/129; 349/130; 349/38
(58) Field of Search ................................ 349/110, 129, 349/143, 130, 155, 156, 38, 39

(56) References Cited

U.S. PATENT DOCUMENTS

| | | | |
|---|---|---|---|
| 3,914,022 A | 10/1975 | Kashnow | 350/160 L |
| 4,581,608 A | 4/1986 | Aftergut et al. | 340/704 |
| 4,701,028 A | 10/1987 | Clerc et al. | 350/337 |
| 4,728,175 A | 3/1988 | Baron | 350/336 |
| 4,786,147 A | 11/1988 | Clerc et al. | 350/337 |
| 4,889,412 A | 12/1989 | Clerc et al. | 350/347 |
| 4,937,666 A | 6/1990 | Yang | 358/136 |
| 4,978,203 A | 12/1990 | Yamazaki et al. | 350/339 R |
| 5,039,185 A | 8/1991 | Uchida et al. | 359/75 |
| 5,093,741 A | 3/1992 | Shohara et al. | 359/90 |
| 5,182,664 A | 1/1993 | Clerc | 359/93 |
| 5,229,873 A | 7/1993 | Hirose et al. | 359/55 |
| 5,249,070 A | 9/1993 | Takano | 359/54 |
| 5,309,264 A | 5/1994 | Lien et al. | 359/87 |
| 5,339,181 A | 8/1994 | Kim et al. | 359/59 |

(List continued on next page.)

FOREIGN PATENT DOCUMENTS

| | | |
|---|---|---|
| EP | 0159161 A1 | 10/1985 |
| EP | 0159161 B1 | 10/1985 |
| EP | 0752611 A2 | 1/1997 |
| EP | 0752611 A3 | 11/1997 |
| EP | 0814142 A2 | 12/1997 |
| EP | 0854377 A2 | 7/1998 |
| EP | 0814142 A3 | 12/1998 |
| EP | 0884626 A2 | 12/1998 |
| EP | 884626 A2 * | 12/1998 ......... G02F/01/139 |
| EP | 0854377 A3 | 3/1999 |

(List continued on next page.)

OTHER PUBLICATIONS

A. Lien et al.; "Two–Domain TN–LCDs Fabricated by Parallel Fringe Field Method"; SID '93 Digest; pp. 269–272.

(List continued on next page.)

*Primary Examiner*—Kenneth Parker
*Assistant Examiner*—David Chung
(74) *Attorney, Agent, or Firm*—McKenna Long & Aldridge LLP (57) ABSTRACT

The present invention discloses a multi-domain liquid crystal display device and method of fabricating the same. More specifically, a multi-domain liquid crystal display device having first and second substrates includes a pixel electrode over the first substrate, a side electrode surrounding the pixel electrode, a common electrode over the second substrate, a first dielectric structure on the common electrode, and at least one second dielectric structure over the second substrate.

25 Claims, 9 Drawing Sheets

U.S. PATENT DOCUMENTS

| | | | |
|---|---|---|---|
| 5,477,358 A | 12/1995 | Rosenblatt et al. | 359/77 |
| 5,517,341 A | 5/1996 | Kim et al. | 359/59 |
| 5,517,342 A | 5/1996 | Kim et al. | 359/59 |
| 5,574,582 A | 11/1996 | Takeda et al. | 359/59 |
| 5,576,863 A | 11/1996 | Aoki et al. | 359/76 |
| 5,602,662 A | 2/1997 | Rosenblatt et al. | 349/130 |
| 5,608,556 A | 3/1997 | Koma | 349/143 |
| 5,621,558 A | 4/1997 | Shimada et al. | 349/130 |
| 5,623,354 A | 4/1997 | Lien et al. | 349/124 |
| 5,666,179 A | 9/1997 | Koma | 349/143 |
| 5,668,650 A | 9/1997 | Mori et al. | 349/42 |
| 5,673,092 A | 9/1997 | Horie et al. | 349/86 |
| 5,686,977 A | 11/1997 | Kim et al. | 349/38 |
| 5,737,051 A | 4/1998 | Kondo et al. | 349/141 |
| 5,748,276 A | 5/1998 | Uno et al. | 349/144 |
| 5,767,926 A | 6/1998 | Kim et al. | 349/38 |
| 5,777,701 A | 7/1998 | Zhang | 349/44 |
| 5,777,711 A | 7/1998 | Sugiyama | 349/143 |
| 6,256,080 B1 * | 7/2001 | Colgan et al. | 349/129 |
| 6,356,335 B1 * | 3/2002 | Kim et al. | 349/156 |
| 6,392,729 B1 * | 5/2002 | Izumi et al. | 349/110 |
| 6,400,440 B1 * | 6/2002 | Colgan et al. | 349/160 |
| 6,476,896 B1 * | 11/2002 | Liu | 349/129 |
| 6,504,592 B1 * | 1/2003 | Takatori et al. | 349/129 |

FOREIGN PATENT DOCUMENTS

| | | |
|---|---|---|
| EP | 0884626 A3 | 3/2001 |
| GB | 2296810 A | 7/1996 |
| GB | 2321718 A | 8/1998 |
| GB | 2337843 A | 12/1999 |
| JP | 1149076 | 6/1989 |
| JP | 1149079 | 6/1989 |
| JP | 2294622 | 12/1990 |
| JP | 3261914 | 11/1991 |
| JP | 4067127 | 3/1992 |
| JP | 4261522 | 9/1992 |
| JP | 5297412 | 11/1993 |
| JP | 6002161 | 1/1994 |
| JP | 6194656 | 7/1994 |
| JP | 6194657 | 7/1994 |
| JP | 6258649 | 9/1994 |
| JP | 6273798 | 9/1994 |
| JP | 6281959 | 10/1994 |
| JP | 6301036 | 10/1994 |
| JP | 6347824 | 12/1994 |
| JP | 7013164 | 1/1995 |
| JP | 7013166 | 1/1995 |
| JP | 7028063 | 1/1995 |
| JP | 7036044 | 2/1995 |
| JP | 7043698 | 2/1995 |
| JP | 7043719 | 2/1995 |
| JP | 7064089 | 3/1995 |
| JP | 7181493 | 7/1995 |
| JP | 7199190 | 8/1995 |
| JP | 7230097 | 8/1995 |
| JP | 7311383 | 11/1995 |
| JP | 8022023 | 1/1996 |
| JP | 8076125 | 3/1996 |
| JP | 8101399 | 4/1996 |
| JP | 8146468 | 6/1996 |
| JP | 8220511 | 8/1996 |
| JP | 8220524 | 8/1996 |
| JP | 8313915 | 11/1996 |
| JP | 9022025 | 1/1997 |
| JP | 9033890 | 2/1997 |
| JP | 9152583 | 6/1997 |
| JP | 9197420 | 7/1997 |
| JP | 9230360 | 9/1997 |
| JP | 9230387 | 9/1997 |
| JP | 9236821 | 9/1997 |
| JP | 9325373 | 12/1997 |
| JP | 10301112 | 11/1998 |
| JP | 10333180 | 12/1998 |
| JP | 11109355 | 4/1999 |
| JP | 11109356 | 4/1999 |
| JP | 11109358 | 4/1999 |
| JP | 11109362 | 4/1999 |
| JP | 11109391 | 4/1999 |
| JP | 11119198 | 4/1999 |
| JP | 11119209 | 4/1999 |
| JP | 1149093 | 6/1999 |
| JP | 11148078 | 6/1999 |
| JP | 11223807 | 8/1999 |
| JP | 11223808 | 8/1999 |
| WO | WO 9610774 | 4/1996 |

OTHER PUBLICATIONS

A. Lien et al.; "TFT–Addressed Two–Domain TN VGA Displays Fabricated Using the Parallel–Fringe–Field Method"; SID '94 Digest; pp. 594–596.

N. Koma et al.; "No–Rub Multi–Domain TFT–LCD Using Surrounding–Electrode Method"; SID 95 Digest; pp. 869–872.

H. Murai, et al.; "Novel High Contrast Random and Controlled 4–Domain CTN–LCDs with Wide Viewing Angle"; Euro Display '96; p. 159–162.

Y. Koike et al.; "A Vertically Aligned LCD Providing Super–High Image Quality"; IDW '97; pp. 159–162.

K. Ohmuro et al.; Development of Super–High–Image–Quality Vertical–Alignment–Mode LCD; SID '97 Digest; pp. 845–848.

N. Koma et al.; Development of a High–Quality TFT–LCD for Projection Displays; SID '97 Digest; pp. 461–464.

* cited by examiner

MULTI-DOMAIN LIQUID CRYSTAL DISPLAY DEVICE AND METHOD OF FABRICATING THE SAME

This application claims the benefit of Korean Application No. P2000-35650, filed Jun. 27, 2000, which is hereby incorporated by reference as if fully set forth herein.

BACKGROUND OF THE INVENTION

1. Field of the Invention

The present invention relates to a liquid crystal display, and more particularly, to a multi-domain liquid crystal display device and method of fabricating the same. Although the present invention is suitable for a wide scope of applications, it is particularly suitable for minimizing a disclination area, thereby improving picture quality.

2. Discussion of the Related Art

Figure 1:
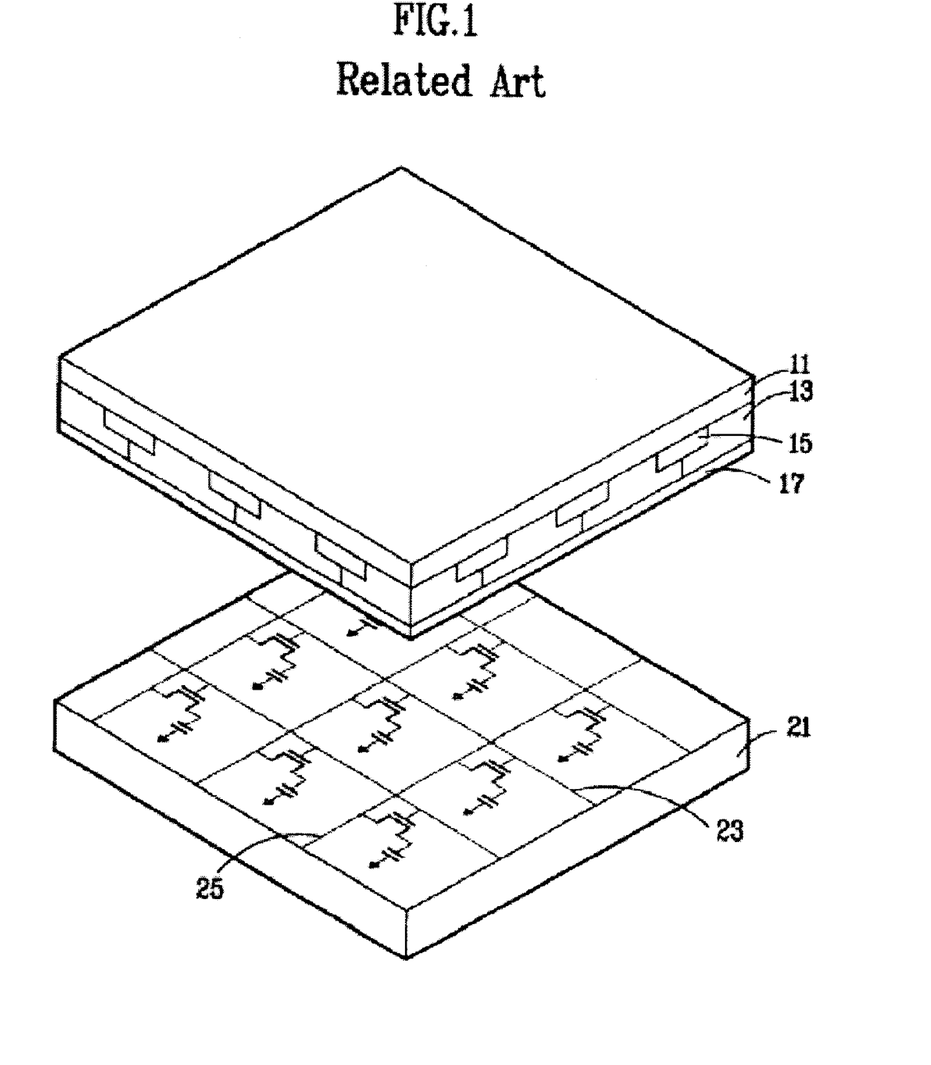
FIG. 1 is a structure of a conventional LCD.

As shown in FIG. 1, a liquid crystal display (LCD) includes a first substrate 11, a second substrate 21, and a liquid crystal sealed between the first and second substrates 11 and 21 according to the related art. More specifically, the first substrate 11 has R, G, B color filter 13 for representing colors, a black matrix 15 for blocking light from being transmitted to the portion other than pixel regions of the second substrate, and a common electrode 17 for applying a common voltage Vcom to a panel, which are formed thereon.

The second substrate 21 has gate lines 23 and data lines 25 arranged thereon in matrix to define the pixel regions. Each pixel region includes a thin film transistor (TFT) and a pixel electrode.

Currently, one of the most widely used the liquid crystal displays is a twisted nematic (TN) mode LCD. The TN-mode LCD is constructed in a manner that electrodes are respectively formed on the two substrates and liquid crystal molecules filled between them are twisted in a spiral shape, parallel to the substrates and having a predetermined pitch.

In this structure, a voltage is applied to the electrodes to drive a liquid crystal director. However, the TN-mode LCD has poor contrast because light is not completely blocked in an OFF-state. Furthermore, the TN-mode LCD generates a gray inversion so that a contrast ratio varies with angles to invert luminance of medium gray, thereby causing a difficulty in obtaining stabilized images. Moreover, the TN-mode LCD does not have satisfactory viewing angle.

A variety of research has been conducted for solving the narrow viewing angle problem of the LCDs. The research includes a film-compensated mode for compensating a viewing angle with a compensation film, a multi-domain mode in which pixels are divided into multiple domains and each domain has a different main viewing angle direction to compensate the viewing angle, an in-plane switching mode in which two electrodes are placed on the same substrate to generate a horizontal electric field, and an OCB (optically compensated birefringence) mode.

Meanwhile, a vertical alignment (VA) mode LCD uses a negative liquid crystal so that dielectric constant anisotropy is negative and a vertical alignment film. In a VA LCD, the longer sides of the liquid crystal molecules are arranged perpendicular to the plane of the alignment film when no voltage is applied, and a polarizing axis of a polarizer attached onto the substrate is located perpendicular to the longer sides of the liquid crystal molecules, to represent normally black mode.

On the other hand, when a voltage is applied to the LCD, the longer sides of the molecules are moved from the direction perpendicular to the alignment film plane toward the alignment film plane to transmit the light according to the characteristic that the negative liquid crystal molecules are orientated and inclined with respect to the electric field.

The VA-mode LCD is superior to the TN-mode LCD in terms of a contrast ratio, a response time, and so on. Furthermore, in case where a direction in which the liquid crystal molecules fall is divided into a predetermined number of multiple directions and a compensated film is employed, a viewing angle can be effectively realized.

Moreover, there have been recently proposed PVA (patterned vertical alignment) and MVA (multi-domain vertical alignment) in which structures such as side electrodes and ribs or slits are formed on the substrate to distort the electric field applied to the liquid crystal layer, instead of alignment treatment, thereby locating the liquid crystal molecular director in a desired direction.

Figure 2A:
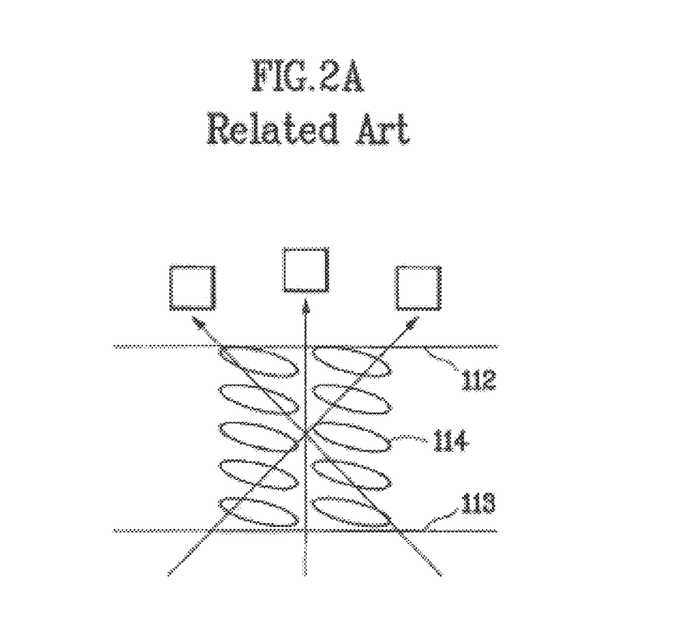
FIGS. 2A to 2C are cross-sectional views for a conventional TN type LCD.
Figure 2B:
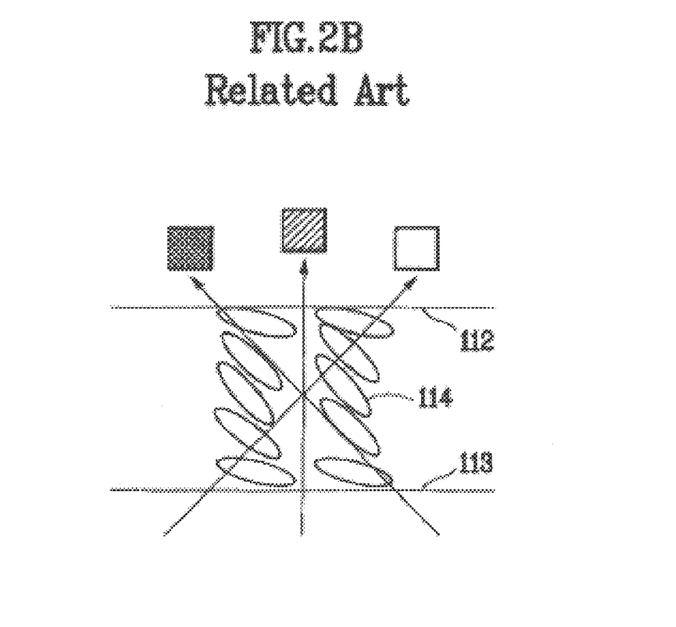
Figure 2C:
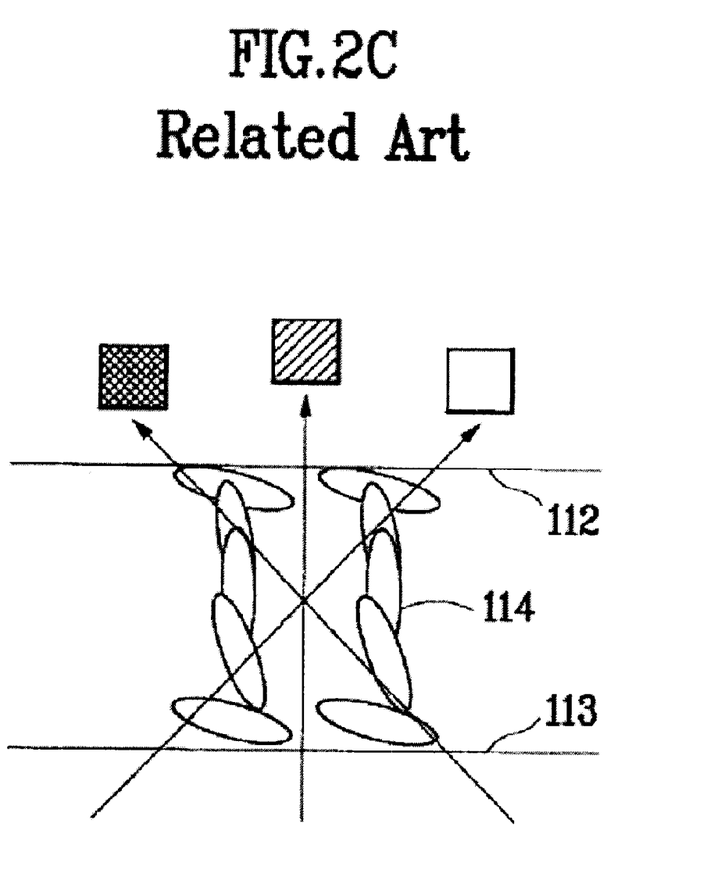
Figure 3A:
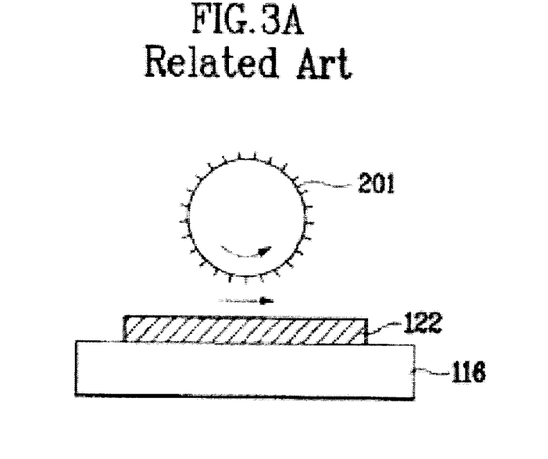
FIGS. 3A to 3C are cross-sectional views to show an alignment division according to a rubbing process.
Figure 3B:
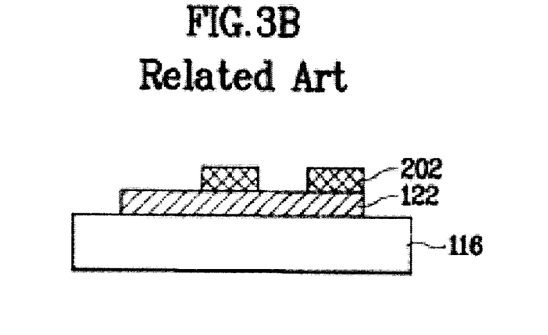
Figure 3C:
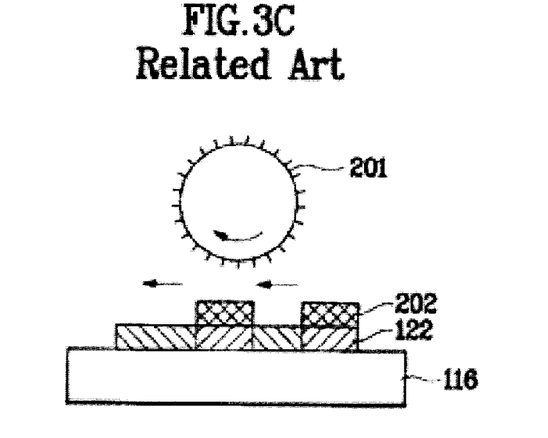

FIGS. 2A to 2C are cross-sectional views for explaining problems of the TN LCD while FIGS. 3A to 3C are cross-sectional views for explaining an alignment division according to a rubbing process. Although the TN LCD among TFT LCDs has advantages of excellent contrast and satisfactory color reproducibility, it has a disadvantage of a narrow viewing angle.

Referring to FIG. 2A, in a normally white mode TN LCD, liquid crystal molecules 114 are aligned in the same direction with a slight inclination (about 1 to 5°) when no voltage is applied between two substrates 112 and 113 of the LCD. In this state, light is seen nearly white in any azimuth. In case of application of a voltage higher than a threshold value, as shown in FIG. 2C, intermediate liquid crystal molecules 114, except for those located near the substrates 112 and 113, are aligned in a vertical direction. Incident linearly polarized light is therefore seen blocked, but not twisted. At this time, light obliquely incident on a screen (panel) has the direction of polarization thereof twisted to some extent because it passes obliquely through the liquid crystal molecules 114 aligned in the vertical direction. The light is therefore seen halftone (gray) but not perfect black.

As shown in FIG. 2B, in the state in which an intermediate voltage lower than the voltage applied in the state shown in FIG. 2C is applied, the liquid crystal molecules 114 near the alignment layers are aligned in a horizontal direction, but the liquid crystal molecules 114 in the middle parts erect themselves halfway. The birefringent characteristic of the liquid crystal is lost to some extent. This causes transmittance to deteriorate and cause halftone (gray).

However, this refers only to the light incident perpendicularly on the liquid crystal panel. The obliquely incident light is seen differently, that is, light is seen differently depending on whether it is seen from the left or right side of the drawing. As illustrated, the liquid crystal molecules 114 are aligned mutually parallel relative to the light propagating from the light below to left above.

The liquid crystal hardly exerts a birefringence effect. Therefore, when the panel is seen from the left side, it is seen black. By contrast, the liquid crystal molecules 114 are aligned vertically relative to light propagating from light below to right above. The liquid crystal exerts a great birefringence effect relative to incident light, and the incident light is twisted. This results in nearly white display. Thus, the most critical drawback of the TN LCD is that a display state varies with a viewing angle.

It is known that a viewing angle of the liquid crystal display device (LCD) in the TN mode can be improved by setting orientation directions of the liquid crystal molecules inside pixels to a plurality of mutually different directions. Generally, the orientation direction of the liquid crystal molecules (pretilt angles) which keep in contact with a substrate surface in the TN mode are restricted by the direction of a rubbing treatment applied to the alignment film.

The rubbing treatment is a process in which the surface of the alignment film is rubbed in one direction by a cloth such as rayon, so that the liquid crystal molecules are orientated in the rubbing direction. Therefore, a viewing angle can be improved by making a different rubbing direction inside the pixels.

FIGS. 3A to 3C show a method of making a different rubbing direction inside pixels. As shown in the drawing, an alignment film 122 is formed on a glass substrate 116. For simplicity, electrodes and other elements are omitted from the drawing. The alignment film 122 is then bought into contact with a rubbing roll 201 to perform a rubbing treatment in one direction.

Next, a photoresist is applied to the alignment film 122 and a predetermined pattern is exposed and developed by photolithography. As a result, a layer 202 of the photoresist which is patterned is formed as shown in FIG. 3B. Then, the alignment film 122 is brought into contact with the rubbing roll 201 that is rotating to the opposite direction to the previous rubbing, so that only the open portions of the pattern are rubbed.

In this way, a plurality of regions that are subjected to the rubbing treatment in different directions are formed inside the pixel, and the orientation directions of the liquid crystal become plural inside the pixel. Incidentally, the rubbing treatment can be done in arbitrarily different directions when the alignment film 122 is rotated relative to the rubbing roll 201.

Although the rubbing treatment has gained a wide application, it is the treatment that rubs and consequently damages the surface of the alignment film. In addition, problems related to dust are likely to occur.

A method, which forms a concave-convex pattern on an electrode, is known as another method of restricting a pretilt angle of the liquid crystal molecules in the TN mode. The liquid crystal molecules in the proximity of the electrodes are orientated along the surface having concave-convex pattern.

Meantime, in the VA LCD, in which a vertical alignment and a negative liquid crystal are applied, the alignment direction of the liquid crystal molecules is divided in order to improve a viewing angle. In this case, it is preferable to increase the viewing angle corresponding to an IPS mode, while maintaining a contrast ratio and a response time as high as those of the conventional LCD.

It is possible to make domains in the VA mode uniform by arranging the liquid crystal molecules aligned obliquely at the initial stage to be uniformly orientated in multiple directions in each pixel when an electric field is applied thereto. Here, the domain at least on one substrate must be divided and an inclined surface should be formed on the substrate having the divided domains. The inclined surface includes one slanted nearly perpendicular to the substrate. The vertical alignment film is not required to be rubbed in this case.

The liquid crystal molecules are aligned perpendicular to the substrate when no voltage is applied to the VA LCD. However, they have a slope relative to the substrate due to the inclined surface. Upon application of the voltage, the liquid crystal molecules are tilted due to intensity of the electric field. In this instance, the tilt angle due to the electric field has a rotation direction of 360° because the electric field is created perpendicular to the substrate.

Figure 4:
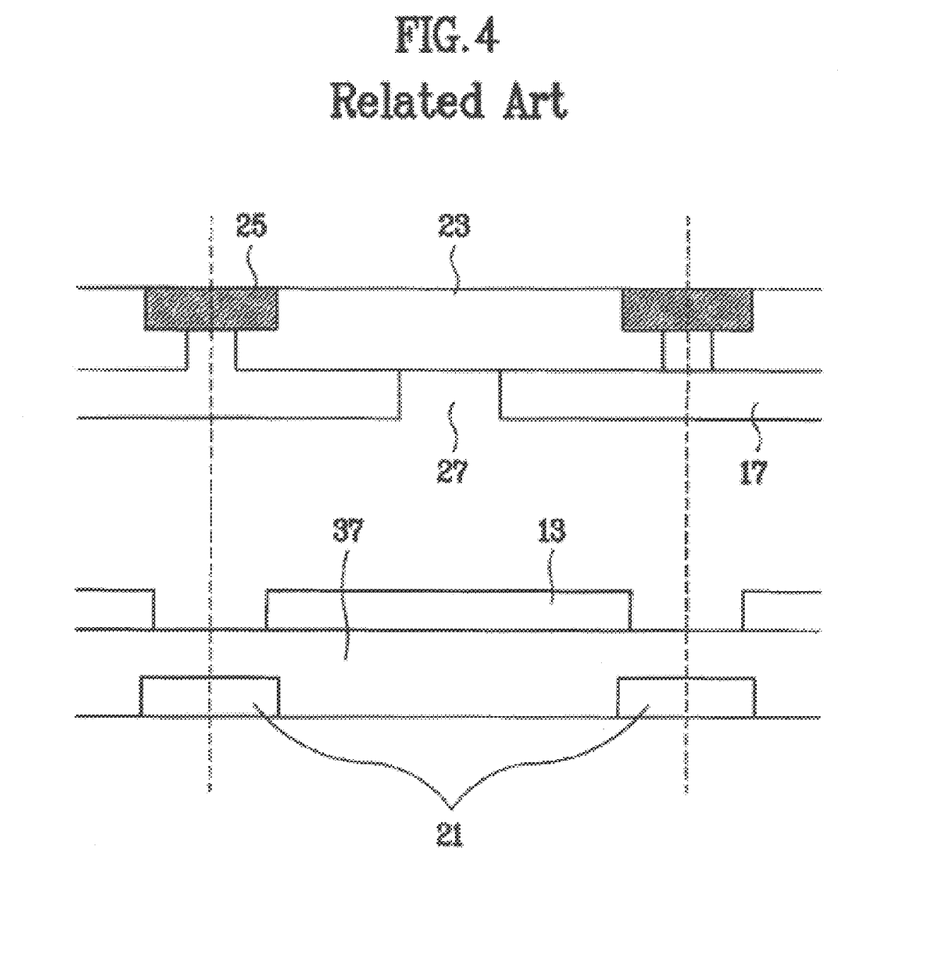
FIG. 4 is a cross-sectional view of a conventional multi-domain LCD.

The conventional LCD is explained below with reference to the accompanying drawing. FIG. 4 is a cross-sectional view of the conventional LCD that drives a liquid crystal using an auxiliary electrode electrically isolated from the pixel electrode without alignment of the liquid crystal.

Referring to FIG. 4, the conventional LCD includes first and second substrates, a plurality of data lines and gate lines arranged in an intersecting manner on the first substrate to divide the first substrate into plurality of pixel regions. Further, the LCD includes a thin film transistor consisting of a gate electrode, a gate insulating layer, a semiconductor layer, an ohmic contact layer, and source and drain electrodes, formed at each pixel region on the first substrate. The LCD further has a protecting layer 37 formed on the overall surface of the first substrate, a pixel electrode 13 formed on the protective layer 37 connected to the drain electrode, and an auxiliary electrode 21 formed on the gate insulating layer. The pixel electrode 13 is partially superposed on the auxiliary electrode 21. FIG. 4 shows a unit pixel.

An opening area 27 of a common electrode 17 and the auxiliary electrode 21 formed around the pixel electrode 13 distort the electric field applied to the liquid crystal layer to variously drive the liquid crystal molecules in the unit pixel. This means that a dielectric energy due to the distorted electric field locates the liquid crystal director in a desired direction when a voltage is applied to the LCD. However, the aforementioned conventional LCD has the following problems.

The common electrode requires an opening area in order to obtain a multi-domain effect. Thus, an additional process for patterning the common electrode is required in the fabrication process of the LCD. Furthermore, a degree of distortion of the electric field required for a domain division is weak, so that it takes a long period of time for which the liquid crystal director reaches stable state. Moreover, the strong electric field is applied between the pixel electrode and the auxiliary electrode to cause an abnormal alignment direction, thereby generating a disclination region. This decreases luminance and increases response time.

SUMMARY OF THE INVENTION

Accordingly, the present invention is directed to a multi-domain liquid crystal display device and method of fabricating the same that substantially obviates one or more of problems due to limitations and disadvantages of the related art.

An object of the present invention is to provide a multi-domain liquid crystal display device and method of fabricating the same for improving luminance and response time.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-domain liquid crystal display device having first and second substrates includes a pixel electrode over the first substrate, a side electrode surrounding the pixel electrode, a common electrode over the second substrate, a first dielectric structure on the common electrode, and at least one second dielectric structure over the second substrate.

In another aspect of the present invention, a multi-domain liquid crystal display device includes first and second substrates, a side electrode having first and second sides facing into each other on the first substrate, the side electrode having third and fourth sides which respectively 1 connects one end of the first side and the second side, a pixel electrode in a region defined by the side electrode, a first dielectric structure diagonally located in the region, at least one second dielectric structure over the second substrate, wherein the second dielectric structure is located substantially at the center of each side of the side electrode, and a liquid crystal layer between the first and second substrates.

In another aspect of the present invention, a multi-domain liquid crystal display device includes a first substrate having a gate line, a data line, a plurality of thin film transistors and pixel regions thereon, a plurality of pixel electrodes at the pixel regions, a side electrode on the first substrate, an insulating layer on the side electrode including the first substrate, a second substrate having a color filter and a common electrode thereon, a first dielectric structure on the common electrode and located in a diagonal direction over the pixel electrode, and at least one second dielectric structure on the common electrode, wherein the second dielectric structure is located substantially at the center of each side of the side electrode.

In a further aspect of the present invention, a method of fabricating a multi-domain liquid crystal display having first and second substrates includes forming a side electrode on the first substrate, forming an insulating layer on the side electrode including the first substrate, forming a pixel electrode on the insulating layer, forming a common electrode over the second substrate, forming a first dielectric structure on the common electrode, wherein the first dielectric structure is located in a diagonal direction over the pixel electrode, forming at least one second dielectric structure on the common electrode, wherein the second dielectric structure is located substantially at the center of each side of the side electrode, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A multi-domain LCD of the present invention is prevents abnormal variation of the alignment of liquid crystal molecules caused by a strong electric field distortion generated at the center of the side electrode.

Figure 5:
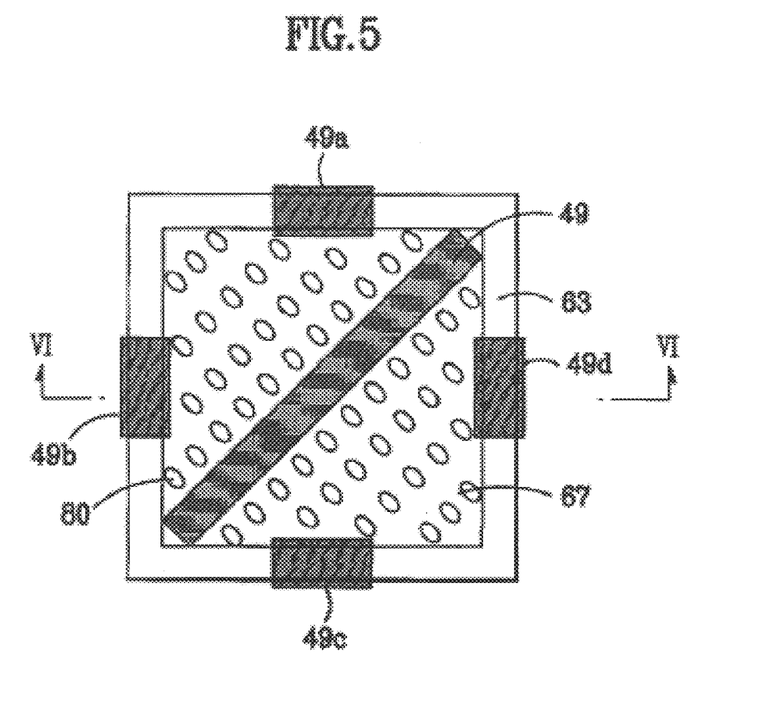
FIG. 5 is a plan view of a multi-domain LCD according to the present invention.
Figure 6:
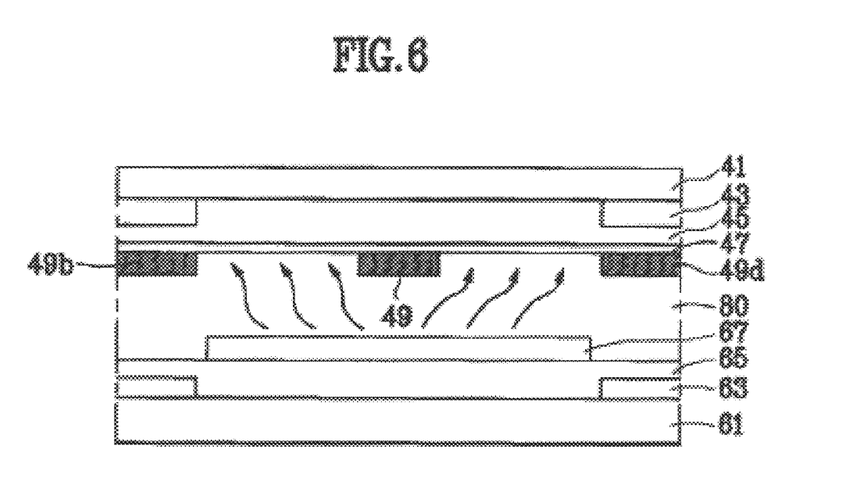
FIG. 6 is a cross-sectional view taken along the line VI—VI of FIG. 5.

FIG. 5 is a plan view of a multi-domain LCD according to the present invention, showing a unit pixel, and FIG. 6 is a cross-sectional view taken along the line VI—VI of FIG. 5.

Referring to FIG. 5, the multi-domain LCD of the invention includes a pixel electrode 67, a side electrode 63 formed along the sides of the pixel electrode 67 and placed at the level below the pixel electrode, a first dielectric structure 49 formed in a diagonal direction of the pixel electrode 67, and second dielectric structures 49a, 49b, 49c and 49d formed at the positions corresponding to the centers of the four sides of the side electrode 63. The first dielectric structure 49 and the second dielectric structures 49a, 49b, 49c and 49d are formed on a common electrode 47 (shown in FIG. 6) located on a second substrate 41, whereas the side electrode 63 and the pixel electrode 67 are formed on a first substrate 61.

Specifically, as shown in FIG. 6, a black matrix 43 and a color filter 45 are formed on the second substrate 41. The black matrix 43 blocks light from being transmitted through a region other than the pixel electrode 67 (shown in FIG. 5) on the first substrate 61, and the color filter 45 is for representing colors. The common electrode 47 is formed on the color filter 45, and the first dielectric structure 49 and the second dielectric structures 49a, 49b, 49c and 49d are formed thereon.

A thin film transistor (not shown) and the pixel electrode 67 are formed on the first substrate 61 while the side electrode 63 is formed along the sides of the pixel electrode 67 with an insulating layer formed therebetween. Here, the pixel electrode 67 may or may not be partially superposed on, or overlapping, the side electrode 63.

The thin film transistor is formed at the portion where a gate line and a data line are intersected each other. The pixel electrode 67 is electrically connected with the drain electrode of the thin film transistor. The first dielectric structure 49 and the second dielectric structures 49a, 49b, 49c and 49d are formed of the same material including one of acrylic resin, BCB (benzocyclobutene) and black resin.

In addition, a phase retardation film (not shown) may be formed at least on one of the first and second substrates. The phase retardation film that is a negative uniaxial film is formed of a uniaxial material having one optical axis and compensates for a difference between a viewing angle in the direction perpendicular to the substrates and those in other directions.

Accordingly, it is possible to widen an area having no gray inversion. Thus, a contrast ratio is increased in an inclined direction, and one pixel is formed with multiple liquid crystal domains, thereby compensating for a difference between the viewing angles at the left and right directions more effectively. The phase retardation film can be formed from a negative biaxial film instead of the negative uniaxial film. The negative biaxial film formed of a biaxial material having two optical axes may have a viewing angle wider than that of the uniaxial film. After forming the phase retardation film, a polarizer (not shown) is attached onto both substrates. The polarizer may be combined with the phase retardation film and attached to the substrates.

Moreover, a liquid crystal layer having positive or negative dielectric anisotropy is sealed between the first and second substrates 41 and 61. The liquid crystal layer may include a chiral dopant.

The above-described multi-domain LCD of the present invention has an alignment film (not shown) formed on the overall surface of the first substrate and/or second substrate. This alignment film may be formed of a material having photo-sensitivity, such as PVCN (polyvinyl-fluorocinnamate), PSCN (polysiloxanecinnamate), CelCN (cellulosecinnamate) compound.

In addition, the alignment film can be formed of any material suitable for a photo-alignment treatment. The photo-alignment film is irradiated by light at least once to determine a pretilt angle and an alignment direction or a pretilt direction of the liquid crystal molecules, thereby securing an alignment stability of the liquid crystal layer. Light used for the photo-alignment treatment is preferably ultraviolet light, and it may be any light selected from non-polarized light, unpolarized light, linearly polarized light, and partially polarized light.

The photo-alignment can be applied to one of the first and second substrates or both of them. It is also possible that different alignment treatments are performed for each of the two substrates or only the alignment film is formed on the substrates without an alignment treatment.

Furthermore, the alignment treatment is carried out so as to form a multi-domain LCD with at least two divided regions (domains) so that the liquid crystal molecules in the divided regions (domains) can be aligned differently from each other. That is, a pixel area is divided into four domains in the form of + or X, or split vertically, horizontally or diagonally, for instance. An alignment treatment may be differently performed for each of the divided domains and each of the substrates to have different alignment directions, thereby realizing a multi-domain effect.

Moreover, it is possible that an inorganic alignment film using an inorganic material such as silicon oxide (SiOx) or silicon nitride (SiNx) instead of a photo-alignment film is formed and rubbed to control an alignment direction of the liquid crystal molecules. Alternatively, an organic polymer thin film is formed on the substrate through spin coating or print coating and hardened to adjust the alignment direction by a rubbing method. Here, a polyimide alignment film using a polymer compound is generally used as the organic polymer thin film.

A method of fabricating the aforementioned multi-domain LCD of the present invention is explained hereinafter with reference to FIGS. 7A to 7C.

Figure 7A:
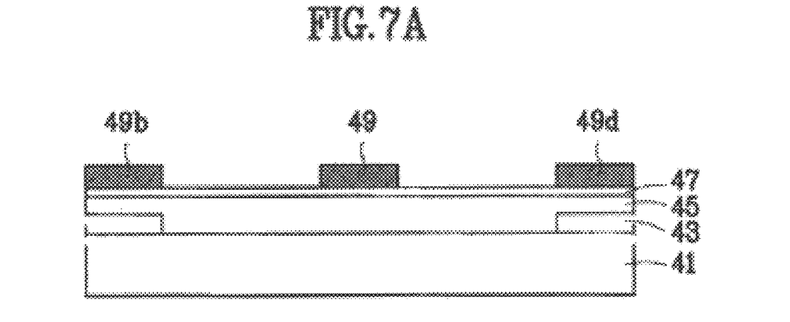
FIGS. 7A to 7C are cross-sectional views illustrating a method of fabricating the multi-domain LCD according to the present invention.

Referring to FIG. 7A, the black matrix 43 and the color filter 45 are formed on the second substrate 41. The black matrix 43 may be formed of one of Cr, CrOx and CrNx, or a double-layer of Cr and CrOx or Cr and CrNx. Then, the common electrode 47 is formed on the overall surface of the second substrate having the color filter 45. Thereafter, the first dielectric structure 49 and the second dielectric structures 49a, 49b, 49c and 49d are formed thereon.

Here, the first dielectric structure 49 diagonally traverses the pixel electrode formed on the first substrate, and the second dielectric structures 49a, 49b, 49c and 49d are formed at the positions corresponding to the center of the four sides of the side electrode 63 formed along the sides of the pixel electrode 67.

Figure 7B:
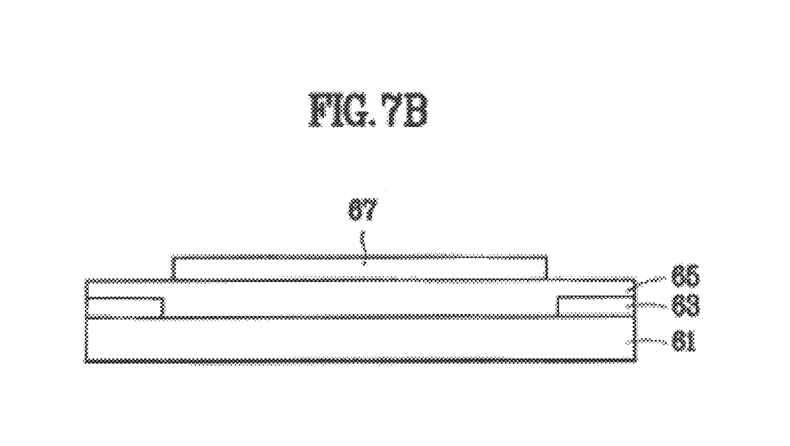

Referring to FIG. 7B, the side electrode 63 is formed on the first substrate 61 and the insulating layer 65 is formed on the overall surface of the first substrate 61 including the side electrode 63. The side electrode 63 is patterned to be located along the side of the pixel electrode, which will be formed subsequently.

The insulating layer 65, which serves as a gate insulating (not shown) layer, is formed on the substrate after the gate line is formed on the first substrate. The insulating layer 65 is formed of silicon nitride or silicon oxide. Further, it may be formed of an acrylic resin, or a polyimide compound for improving an aperture ratio.

A thin film transistor (not shown) is formed on the first substrate 61. The thin film transistor is constructed in such a manner that the gate electrode is formed of Al, Mo, Cr or Al alloy on the first substrate 61. The gate insulating layer 65 is formed on the overall surface of the first substrate 61 including the gate electrode, a semiconductor layer is formed on the gate insulating layer 65 and then source and drain electrodes are formed thereon. Here, the drain electrode is electrically connected through a contact hole to the pixel electrode 67, which will be subsequently formed.

Although the side electrode 63 and the gate electrode are formed at the same layer in the figure, the side electrode 63 and the pixel electrode 68 can be formed at the same layer. Specifically, the side electrode 63 is formed when the source and drain electrodes are fabricated after formation of the gate insulating layer 65. Alternatively, it is formed when the pixel electrode electrically connected with the drain electrode is fabricated.

Figure 7C:
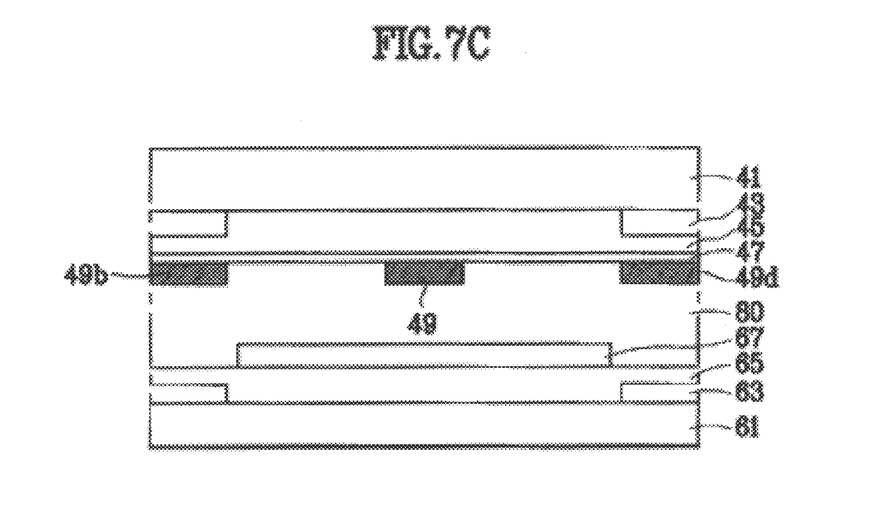

Referring to FIG. 7C, the pixel electrode 67 is formed on the insulating layer 65, and a liquid crystal layer 80 is formed between the first and second substrates 41 and 61, thereby completing a multi-domain LCD of the invention. The pixel electrode 67 may or may not be partially superposed on, or overlapping, the side electrode 63. The structure of FIG. 7B may be formed prior to the structure of FIG. 7A or both of them may be simultaneously formed.

Figure 8A:
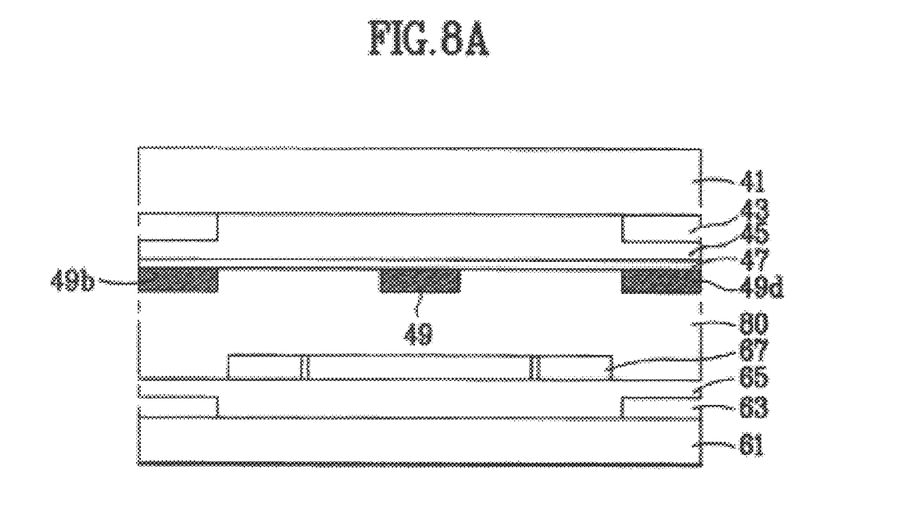
FIG. 8A is a cross sectional view showing a the multi-domain LCD according to the present invention having slits in the pixel electrode.
Figure 8B:
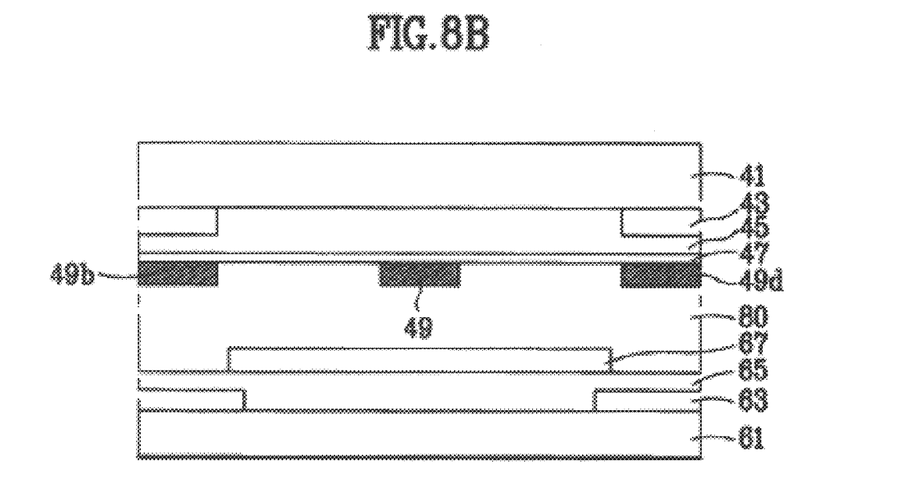
FIG. 8B is a cross sectional view showing a the multi-domain LCD according to the present invention in which the dielectric structure does not overlap an edge of the side electrode and the edge of the pixel electrode overlaps the edge of the side electrode.
Figure 8C:
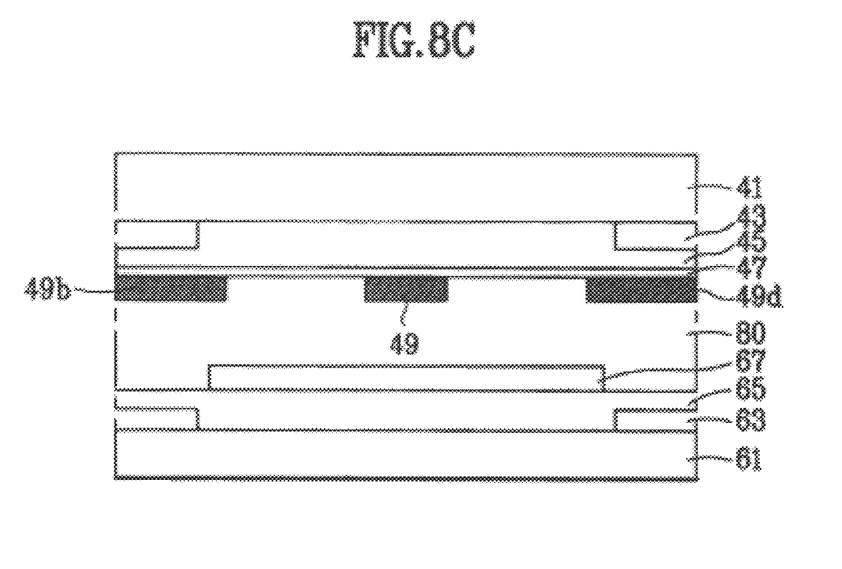
FIG. 8C is a cross sectional view showing a the multi-domain LCD according to the present invention in which the dielectric structure overlaps an edge of the pixel electrode and the edge of the pixel electrode does not overlap the edge of the side electrode.
Figure 8D:
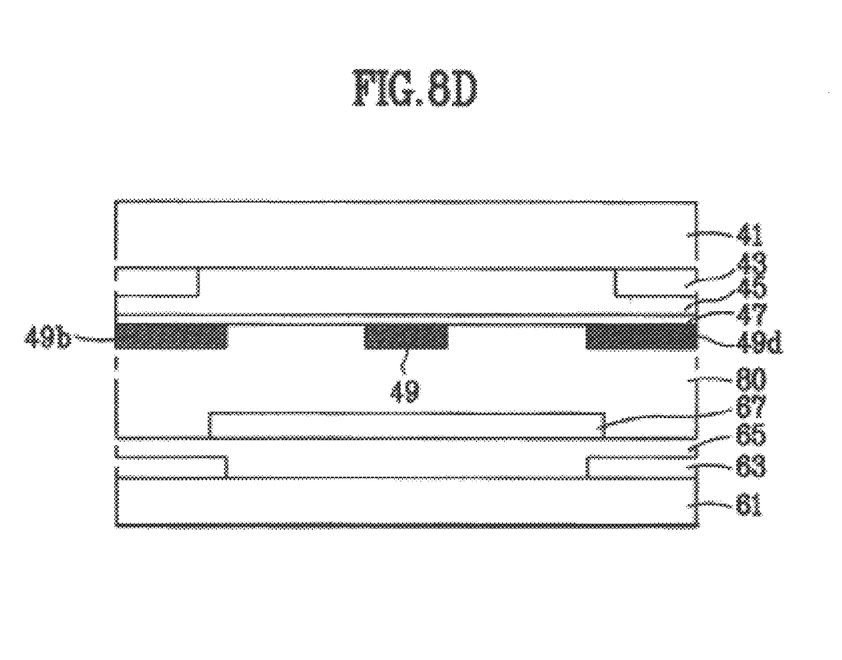
FIG. 8D is a cross sectional view showing a the multi-domain LCD according to the present invention in which the dielectric structure and an edge of the side electrode overlaps an edge of the pixel electrode.

As shown in FIGS. 8A through 8D, various configurations of the side electrode, pixel electrode and dielectric structure are possible. As shown in FIG. 8A, slits may be formed in the pixel electrode 67 of the multi-domain LCD according to the present invention to distort electric field. In addition, as shown in FIG. 8B, the second dielectric structure 49b, 49d, may be configured so as not to overlap an edge of the side electrode 63, and the edge of the pixel electrode 67 may be configured so as not to overlap the edge of the side electrode 63. As shown in FIG. 8C, the second dielectric structure 49b, 49d may be configured to overlap an edge of the pixel electrode 67, and the edge of the pixel electrode 67 may be configured so as not to overlap the edge of the side electrode 63. As shown in FIG. 8D, the second dielectric structure 49b, 49d, and an edge of the side electrode 63 may be configured to overlap an edge of the pixel electrode 67.

In the multi-domain LCD of the present invention, dielectric structures (the second dielectric structures) are formed on the common electrode in order to prevent the alignment direction of the liquid crystal molecules from being abnormally varied due to a strong electric distortion at the center of the side electrode 63. By doing so, an electric field between the side electrode and the pixel electrode is weakened, thereby adjusting the liquid crystal molecules in a corresponding domain to have the same alignment direction.

As described above, the present invention forms dielectric structures to restrict a variation in the alignment direction of the liquid crystal molecules caused by strong electric field distortion at the center of the side electrode for adjusting the alignment direction of the liquid crystal molecules in the domain. Thus, a disclination region is minimized, thereby obtaining a uniform alignment direction in the corresponding domain. Accordingly, a response time is shortened and luminance is increased, so that picture quality is much improved.

It will be apparent to those skilled in the art that various modifications and variations can be made in the multi-domain liquid crystal display and method of fabricating the same of the present invention without departing from the spirit or scope of the inventions. Thus, it is intended that the present invention covers the modifications and variations of this invention provided they come within the scope of the appended claims and their equivalents.

What is claimed is:

1. A multi-domain liquid crystal display device having first and second substrates, comprising:
    a pixel electrode over the first substrate;
    a side electrode surrounding the pixel electrode;
    a common electrode over the second substrate;
    a first dielectric structure on the common electrode; and
    at least one second dielectric structure over the second substrate, wherein the second dielectric structure are substantially located in a center portion of each side of the side electrode.

2. The device of claim 1, wherein the side electrodes are formed below the pixel electrode.

3. The device of claim 1, further comprising a gate insulating layer between the side electrodes and the pixel electrode.

4. The device of claim 1, wherein the first and second dielectric structures are selected from the group consisting of acrylic resin, benzocyclobutene and black resin.

5. The device of claim 1, further comprising a color filter formed on the second substrate.

6. A multi-domain liquid crystal display device, comprising:
    first and second substrates;
    a side electrode having first and second sides facing into each other on the first substrate, the side electrode having third and fourth sides which respectively connects one end of the first side and the second side;
    a pixel electrode in a region defined by the side electrode;
    a first dielectric structure diagonally located in the region;
    at least one second dielectric structure over the second substrate, wherein the second dielectric structure is located substantially at a center portion of each side of the side electrode; and
    a liquid crystal layer between the first and second substrates.

7. The device of claim 6, further comprising an insulating layer between the side electrode and the pixel electrode.

8. The device of claim 7, wherein the insulating layer includes a gate insulating layer.

9. The device of claim 8, wherein the gate insulating layer is selected from the group consisting of benzocyclobutene, acrylic resin and polyimide compound.

10. A multi-domain liquid crystal display device, comprising:
    a first substrate having a gate line, a data line, a plurality of thin film transistors and pixel regions thereon;
    a plurality of pixel electrodes at the pixel regions;
    a side electrode having a plurality of sides on the first substrate;
    an insulating layer on the side electrode including the first substrate;
    a second substrate having a color filter and a common electrode thereon;
    a first dielectric structure on the common electrode and located in a diagonal direction over the pixel electrode; and
    at least one second dielectric structure on the common electrode, wherein the second dielectric structure is located substantially at a center of each side of the side electrode.

11. The device of claim 10, wherein the side electrode has a closed-loop shape.

12. The device of claim 10, wherein the side electrode has first and second sides facing into each other and third and fourth sides which respectively connects one end of the first side and the second side.

13. The device of claim 10, wherein the insulating layer includes a gate insulating layer.

14. A method of fabricating a multi-domain liquid crystal display having first and second substrates, comprising:
    forming a side electrode on the first substrate;
    forming an insulating layer on the side electrode including the first substrate;
    forming a pixel electrode on the insulating layer;
    forming a common electrode having a plurality of sides over the second substrate;
    forming a first dielectric structure on the common electrode, wherein the first dielectric structure is located in a diagonal direction over the pixel electrode;
    forming at least one second dielectric structure on the common electrode, wherein the second dielectric structure is located substantially at a center of each side of the side electrode; and
    forming a liquid crystal layer between the first and second substrates.

15. The method of claim 14, further comprising the step of forming a black matrix and a color filter on the second substrate prior to the step of forming a common electrode over the second substrate.

16. The method of claim 14, further comprising the step of forming a thin film transistor on the first substrate.

17. The method of claim 14, wherein the first and second dielectric structures are formed of the same material.

18. The method of claim 14, wherein the insulating layer is selected from the group consisting of benzocyclobutene, acrylic resin and polyimide compound.

19. A multi-domain liquid crystal display device having first and second substrates, and data and gate lines defining a pixel region and having at least two liquid crystal domains in the pixel region, comprising:

a side electrode on the first substrate;

a pixel electrode on the first substrate, the side electrode surrounding the pixel electrode;

a first dielectric structure on the second substrate at a boundary between the two liquid crystal domains; and at least one second dielectric structure on the second substrate and over a portion of the side electrode.

20. The multi-domain liquid crystal display device of claim 19, wherein the side electrode including parallel side electrode that are parallel to the data lines and transverse side electrodes that cross the pixel region and are perpendicular to the data lines, wherein the at least one second dielectric structure is formed over the parallel side electrodes and the transverse side electrodes.

21. The multi-domain liquid crystal display device of claim 20, wherein the at least one second dielectric structure overlaps a center region of the parallel side electrodes.

22. The multi-domain liquid crystal display device of claim 20, wherein the at least one second dielectric structure overlaps a center portion of the transverse side electrodes.

23. The multi-domain liquid crystal display device of claim 19, wherein the side electrode overlaps a portion of the pixel electrode.

24. The multi-domain liquid crystal display device of claim 19, wherein the at least one second dielectric structure partially overlaps the pixel electrode.

25. The multi-domain liquid crystal display device of claim 19, further comprising slits in the pixel electrode.

* * * * *